(12) United States Patent
Flessas

(10) Patent No.: US 9,794,533 B2
(45) Date of Patent: Oct. 17, 2017

(54) ROBOTICALLY CONTROLLED ENTERTAINMENT ELEMENTS

(71) Applicant: Andrew Flessas, Las Vegas, NV (US)

(72) Inventor: Andrew Flessas, Las Vegas, NV (US)

( * ) Notice: Subject to any disclaimer, the term of this patent is extended or adjusted under 35 U.S.C. 154(b) by 0 days.

(21) Appl. No.: 14/502,495

(22) Filed: Sep. 30, 2014

(65) Prior Publication Data
US 2015/0015785 A1    Jan. 15, 2015

Related U.S. Application Data

(63) Continuation-in-part of application No. 13/745,945, filed on Jan. 21, 2013, now Pat. No. 8,896,242, which is a continuation of application No. 12/653,058, filed on Dec. 7, 2009, now Pat. No. 8,356,704, which is a continuation-in-part of application No. 12/455,638, filed on Jun. 3, 2009, now abandoned, which is a continuation of application No. 11/700,535, filed on Jan. 30, 2007, now Pat. No. 7,545,108.

(60) Provisional application No. 60/763,669, filed on Jan. 31, 2006.

(51) Int. Cl.
| | |
|---|---|
| B25J 9/00 | (2006.01) |
| H04N 9/31 | (2006.01) |
| G03B 21/56 | (2006.01) |
| H04N 5/04 | (2006.01) |
| B25J 11/00 | (2006.01) |
| G06F 1/16 | (2006.01) |
| G06F 3/01 | (2006.01) |
| B25J 9/16 | (2006.01) |

(52) U.S. Cl.
CPC .......... *H04N 9/3141* (2013.01); *B25J 9/1682* (2013.01); *B25J 11/003* (2013.01); *G03B 21/56* (2013.01); *G06F 1/1601* (2013.01); *G06F 3/011* (2013.01); *G06F 3/016* (2013.01); *H04N 5/04* (2013.01); *H04N 9/317* (2013.01); *Y10S 901/50* (2013.01)

(58) Field of Classification Search
CPC ............................. B25J 9/1682; B25J 9/0087
USPC ................ 248/917, 921; 318/568.11, 568.25
See application file for complete search history.

(56) References Cited

U.S. PATENT DOCUMENTS

| | | | |
|---|---|---|---|
| 4,868,473 | A | 9/1989 | Kato |
| 5,078,021 | A | 1/1992 | Freywiss |
| 5,413,454 | A | 5/1995 | Movsesian |
| 5,448,225 | A | 9/1995 | Maignon et al. |
| 5,496,086 | A | 3/1996 | Adrian et al. |

(Continued)

FOREIGN PATENT DOCUMENTS

| | | |
|---|---|---|
| JP | 2000-267579 A | 9/2000 |
| KR | 10-2004-0096097 A | 11/2004 |

OTHER PUBLICATIONS

USPTO Office Action for U.S. Appl. No. 14/502,398, dated Aug. 4, 2015.
U.S. Appl. No. 14/469,198.

*Primary Examiner* — Joseph Dillon, Jr.
(74) *Attorney, Agent, or Firm* — Weide & Miller, Ltd.

(57) ABSTRACT

A robotic mount is configured to move an entertainment element such as a video display, a video projector, a video projector screen or a staircase. The robotic mount is movable in multiple degrees of freedom, whereby the associated entertainment element is moveable in three-dimensional space. In one embodiment, a system of entertainment elements are made to move and operate in synchronicity with each other.

8 Claims, 11 Drawing Sheets

(56) References Cited

U.S. PATENT DOCUMENTS

| | | | |
|---|---|---|---|
| 5,596,683 A * | 1/1997 | Kasagami | B25J 9/1682 700/248 |
| 5,628,660 A | 5/1997 | Onitsuka | |
| 5,652,849 A | 7/1997 | Conway et al. | |
| 5,683,068 A | 11/1997 | Chase et al. | |
| 5,708,527 A | 1/1998 | Adamson et al. | |
| 5,773,984 A | 6/1998 | Suyama et al. | |
| 5,909,998 A | 6/1999 | Herbermann et al. | |
| 5,947,429 A | 9/1999 | Sweere et al. | |
| 6,046,711 A | 4/2000 | Kouchi | |
| 6,085,670 A | 7/2000 | Genov | |
| 6,095,476 A | 8/2000 | Mathis | |
| RE36,978 E | 12/2000 | Moscovitch | |
| 6,212,784 B1 | 4/2001 | Pittman | |
| 6,328,206 B1 | 12/2001 | Schanz et al. | |
| 6,427,823 B1 | 8/2002 | Ishikawa | |
| 6,437,973 B1 | 8/2002 | Helot et al. | |
| 6,456,339 B1 * | 9/2002 | Surati | G03B 37/04 348/744 |
| 6,507,163 B1 | 1/2003 | Allen | |
| 6,655,645 B1 | 12/2003 | Lu et al. | |
| 6,708,940 B2 | 3/2004 | Ligertwood | |
| 6,807,461 B2 | 10/2004 | Kneifel et al. | |
| 6,826,963 B2 | 12/2004 | Liu et al. | |
| 6,914,622 B1 | 7/2005 | Smith et al. | |
| 7,022,962 B2 | 4/2006 | Ohtomo | |
| 7,043,335 B2 | 5/2006 | Yoshida et al. | |
| 7,092,001 B2 | 8/2006 | Schulz | |
| 7,123,285 B2 | 10/2006 | Smith et al. | |
| 7,154,526 B2 | 12/2006 | Foote et al. | |
| 7,163,249 B2 | 1/2007 | Schmidt et al. | |
| 7,296,774 B2 | 11/2007 | Oh | |
| 7,414,603 B2 | 8/2008 | Tseng | |
| 7,463,821 B2 | 12/2008 | DiFrancesco et al. | |
| 7,500,550 B2 | 3/2009 | Strong et al. | |
| 7,545,108 B2 | 6/2009 | Flessas | |
| 7,559,766 B2 | 7/2009 | Epley | |
| 7,576,830 B2 | 8/2009 | DiFrancesco | |
| 7,682,357 B2 | 3/2010 | Ghodoussi et al. | |
| 7,719,222 B2 | 5/2010 | Theobald | |
| 7,720,570 B2 | 5/2010 | Close et al. | |
| 8,016,434 B2 * | 9/2011 | Turner | G03B 21/28 353/46 |
| 8,179,337 B2 * | 5/2012 | Wilzbach | A63G 7/00 104/53 |
| 8,302,488 B2 | 11/2012 | Hsu et al. | |
| 8,356,704 B2 | 1/2013 | Flessas | |
| 8,380,349 B1 | 2/2013 | Hickman et al. | |
| 8,655,429 B2 * | 2/2014 | Kuduvalli | A61N 5/1049 250/491.1 |
| 8,825,225 B1 * | 9/2014 | Stark | G09F 21/06 353/70 |
| 8,896,242 B2 | 11/2014 | Flessas | |
| 8,944,609 B2 | 2/2015 | Fox et al. | |
| 9,067,322 B2 | 6/2015 | Keibel et al. | |
| 9,604,361 B2 * | 3/2017 | Gustafsson | B25J 9/1664 |
| 2003/0089267 A1 | 5/2003 | Ghorbel et al. | |
| 2003/0135203 A1 | 7/2003 | Wang et al. | |
| 2003/0144649 A1 | 7/2003 | Ghodoussi et al. | |
| 2003/0224333 A1 * | 12/2003 | Vastvedt | G09B 9/165 434/29 |
| 2004/0066612 A1 | 4/2004 | Yu | |
| 2004/0199290 A1 | 10/2004 | Stoddard | |
| 2004/0202445 A1 | 10/2004 | DiFrancesco | |
| 2004/0249507 A1 | 12/2004 | Yoshida et al. | |
| 2005/0038416 A1 | 2/2005 | Wang et al. | |
| 2005/0110867 A1 | 5/2005 | Schulz | |
| 2005/0219356 A1 | 10/2005 | Smith et al. | |
| 2006/0061124 A1 | 3/2006 | Schmidt et al. | |
| 2006/0074525 A1 | 4/2006 | Close et al. | |
| 2006/0184272 A1 | 8/2006 | Okazaki et al. | |
| 2007/0064092 A1 | 3/2007 | Sandbeg et al. | |
| 2007/0086155 A1 | 4/2007 | Chen et al. | |
| 2007/0177339 A1 | 8/2007 | Flessas | |
| 2007/0195271 A1 * | 8/2007 | De Zwart | G02B 27/283 353/20 |
| 2007/0250213 A1 * | 10/2007 | Poljen | B25J 9/1671 700/264 |
| 2008/0084566 A1 * | 4/2008 | Hessert | B25J 9/1682 356/510 |
| 2008/0158801 A1 | 7/2008 | Mathews | |
| 2009/0237873 A1 | 9/2009 | Flessas | |
| 2009/0303447 A1 * | 12/2009 | Turner | G03B 21/28 353/51 |
| 2010/0091688 A1 * | 4/2010 | Staszewski | H03D 7/1441 370/277 |
| 2010/0140046 A1 | 6/2010 | Flessas | |
| 2010/0145512 A1 | 6/2010 | Flessas | |
| 2011/0249201 A1 * | 10/2011 | Turner | G03B 21/28 348/744 |
| 2012/0170000 A1 * | 7/2012 | Imaoka | G02B 27/283 353/20 |
| 2013/0181901 A1 * | 7/2013 | West | G09G 5/14 345/161 |
| 2013/0199010 A1 * | 8/2013 | Osato | B23Q 1/00 29/283 |
| 2014/0025202 A1 | 1/2014 | Umeno et al. | |
| 2014/0031983 A1 | 1/2014 | Low et al. | |
| 2014/0102239 A1 | 4/2014 | Umeno | |
| 2014/0233099 A1 * | 8/2014 | Stark | G09F 21/06 359/446 |
| 2015/0015781 A1 | 1/2015 | Flessas | |

* cited by examiner

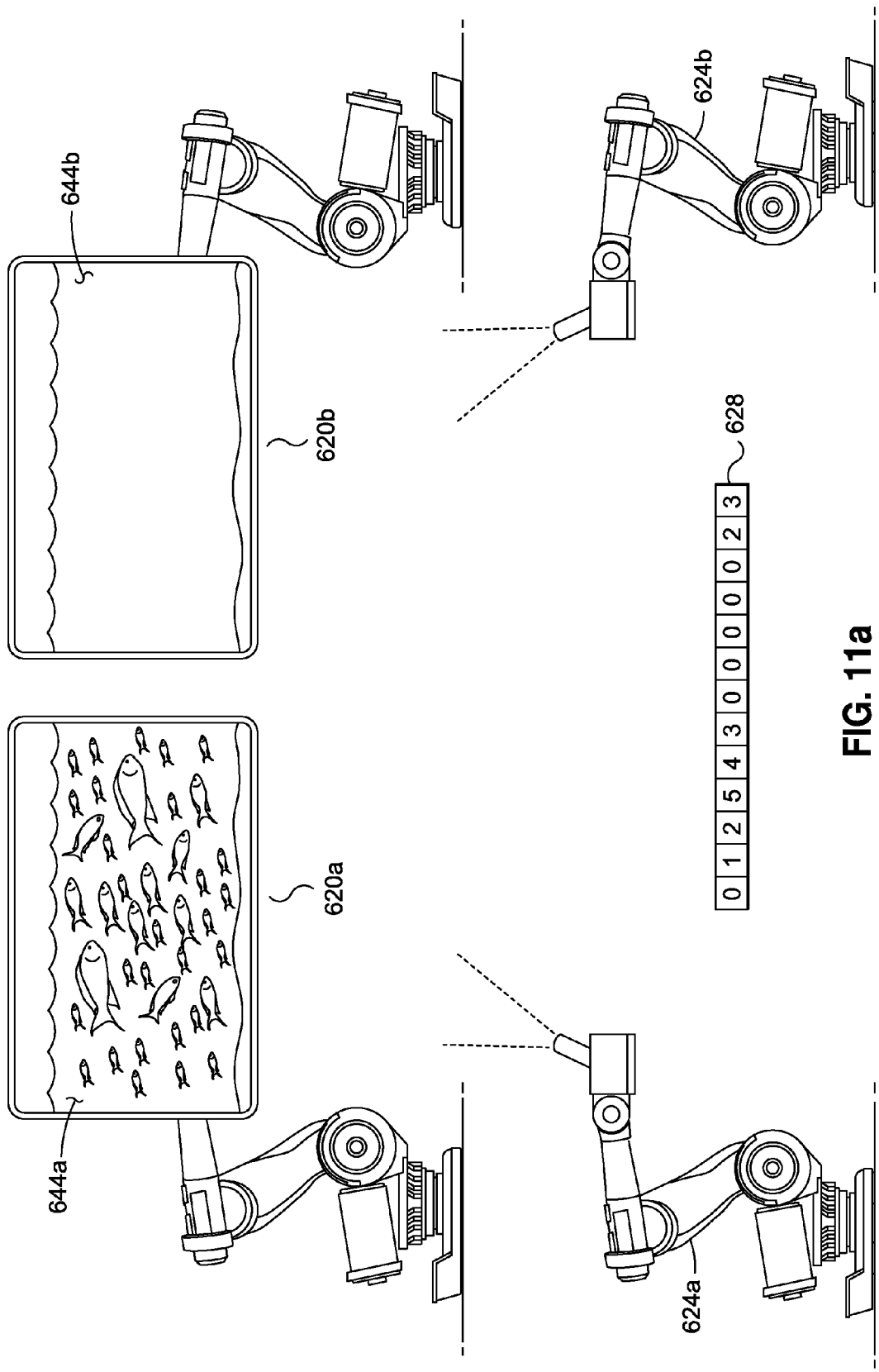

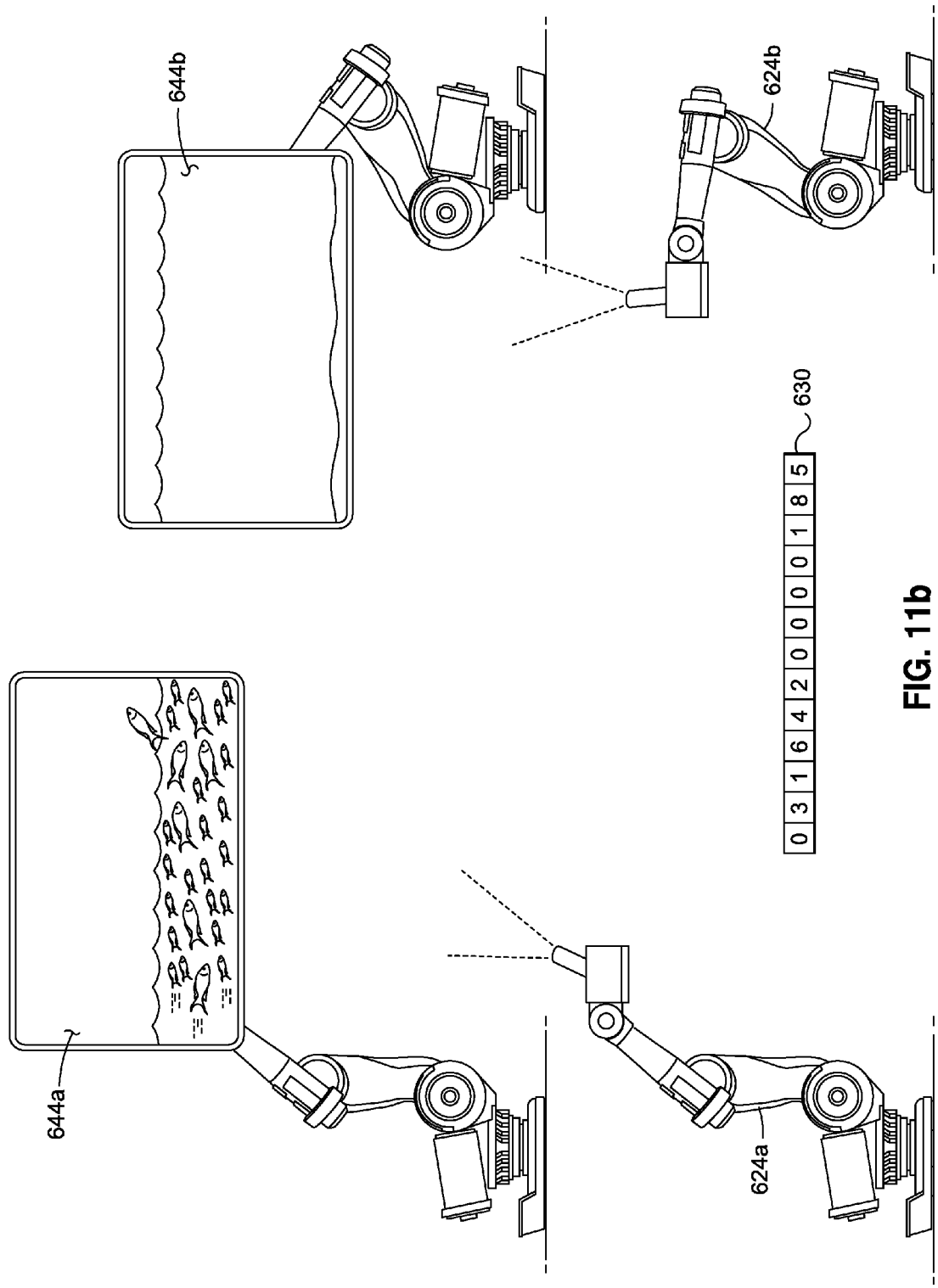

ROBOTICALLY CONTROLLED ENTERTAINMENT ELEMENTS

RELATED APPLICATION DATA

This application is a continuation-in-part of U.S. application Ser. No. 13/745,945, filed Jan. 21, 2013, which is a continuation of U.S. application Ser. No. 12/653,058, filed Dec. 7, 2009, now U.S. Pat. No. 8,356,704, which is a continuation-in-part of U.S. application Ser. No. 12/455, 638, filed Jun. 3, 2009, now abandoned, which is a continuation of U.S. application Ser. No. 11/700,535, filed Jan. 30, 2007, now U.S. Pat. No. 7,545,108, which claims priority to U.S. Provisional Patent Application Ser. No. 60/763,669 filed Jan. 31, 2006.

FIELD OF THE INVENTION

The present invention relates to the movement of entertainment elements.

BACKGROUND OF THE INVENTION

A wide variety of devices are used for entertainment purposes. For example, electronic displays are now extremely common and are utilized in a variety of environments. Such displays were initially used primarily in television sets and to with computers. Initially, these displays were primarily CRT type displays which were large and bulky.

In recent years, other display technologies have been developed. Plasma, LCD, LED and other types of displays are now commercially producible in large display sizes. At the same time, however, these displays are generally thin, thus taking up much less space than CRT type displays offering the same display area.

As such, these displays are now utilized for a variety of purposes. For example, large displays are used at stadiums to present replays of sporting events. These types of displays are also sometimes mounted to walls in stores to present advertising information.

In order to attract attention to advertising, graphic information may be presented on the displays. This information may comprise exciting patterns, such as in bright colors, flashing effects and the like, to draw attention to the display. Still, these displays may be overlooked and advertisers and other users of these displays continue to seek new ways to use these displays and increase their viewership.

Other types of entertainment devices may be used in other settings. For example, in a theatrical production, large props may be located on a stage. The props may be moved into various positions to create different scenes and various actions. The props are often moved manually, such as with ropes and pulleys, limiting the situations where they may be used or their effectiveness.

SUMMARY OF THE INVENTION

The invention comprises moveable entertainment elements and methods of moving one or more entertainment elements.

One embodiment of the invention is a robotic mount. The robotic mount is configured to support one or more entertainment elements and move the one or more entertainment elements in at least three degrees of freedom, and preferably six, and/or at least two dimensions/two-dimensional space, and preferably in three-dimensions/three-dimensional space.

In one embodiment, the robotic mount comprises a base and a movable support. The base supports the display support, such as by resting upon a support surface or by connection to a support, such as a wall or other element.

The moveable support is preferably movable in three dimensional space, whereby one more entertainment elements connected thereto are so movable. In one embodiment, the moveable support comprises a plurality of members which are movably connected to one another in one more directions/dimensions. The moveable support may comprise, for example, a robotic arm having a base, a main support which is rotatable relative to the base, a lower arm which is rotatable relative to the main support, an upper arm which is rotatable relative to the lower arm, and a head to which the one or more entertainment elements are connected, the head movable relative to the upper arm.

In one embodiment, means are provided for moving the moveable support. Preferably, the means permits the moveable mount to be automated in the sense that it can be moved without direct physical contact by a human therewith. This means may comprise one or more electric motors or the like.

One aspect of the invention is a robotically controlled electronic display. The robotically controlled electronic display preferably comprises a robotic mount which supports and moves one or more electronic displays. The electronic displays may comprise, for example, flat panel electronic video displays.

In another embodiment of the invention, a unitary display may comprise two or more individual displays. One or more robotic mounts may be utilized to move one or more or all of the displays of the unitary display. For example, each display of a unitary display comprising a plurality of displays may be associated with its own robotic mount, thus permitting all of the displays of the unitary display to be moved independently and/or synchronously.

Another aspect of the invention comprises a robotically controlled video projector. The robotically controlled video projector comprises a robotic mount which support and moves one or more video projectors. The video projectors may comprise, for example, CRT or DLP type electronic video projectors. The robotic mount may move the one or more projectors to cause then to display information, images, moving images or the like upon various display surfaces such as screens, walls, floors or, as described herein, one or more robotic screens.

Yet another aspect of the invention comprises a robotically controlled staircase. The robotically controlled staircase comprises a robotic mount which supports and moves a staircase. The staircase preferably defines one or more steps from a bottom end to a top end. The robot mount is preferably configured to move the staircase in three-dimensional space, such as from ground level to one or more raised platforms.

In yet another aspect of the invention, the robotic mount supports and moves a screen used for receiving and displaying video or graphic images projected to the screen. The robotic mount is preferably configured to move the screen in three-dimensional space to receive images from the one or more projectors. Multiple robotic screens may receive images from one or more projectors, including robotic projectors. The robotic screens may be made to move in synchronized unison with the movements and projection angles of the one or more robotic projectors.

One embodiment of the invention is a system including a robotic mount and a controller. The controller may be configured to accept input from a user and/or run control programs for generating instructions or output signals which may be used to control the robotic mount and its associated entertainment element (such as its associated video display(s), video projector(s), staircase, or screen). In one embodiment, such a controller may also be configured to control information displayed by the one or more video displays or video projectors, including synchronizing the movement thereof with the images displayed thereby.

Further objects, features, and advantages of the present invention over the prior art will become apparent from the detailed description of the drawings which follows, when considered with the attached figures.

DESCRIPTION OF THE DRAWINGS

FIG. 11a, 11b and 11c illustrate a plurality of robotically controlled screens projectors in operation, in accordance with an embodiment of the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises one or more robotically-controlled objects and objects which are moved by one or more robots, such as electronic displays, projectors, projector screens, cameras, musical instruments, a staircase, or other elements. One embodiment of the invention is a robotically controlled electronic display and methods of using robotically controlled electronic displays, such as methods of moving one or more electronic displays of a group of displays. Another embodiment is a robotically controlled video projector and methods of using robotically controlled projectors to display images. Yet another embodiment of the invention is a robotically controlled staircase and methods of moving a staircase using one or more robots. Other embodiments of the invention comprise robotically controlled projection screens, speakers, cameras or musical instruments. Other aspects of the invention comprise methods and systems for controlling such robotically controlled devices, such as to synchronize movement of a video display or camera to information being captured or displayed; or the projection of images from a projector to a projector screen.

Figure 1:
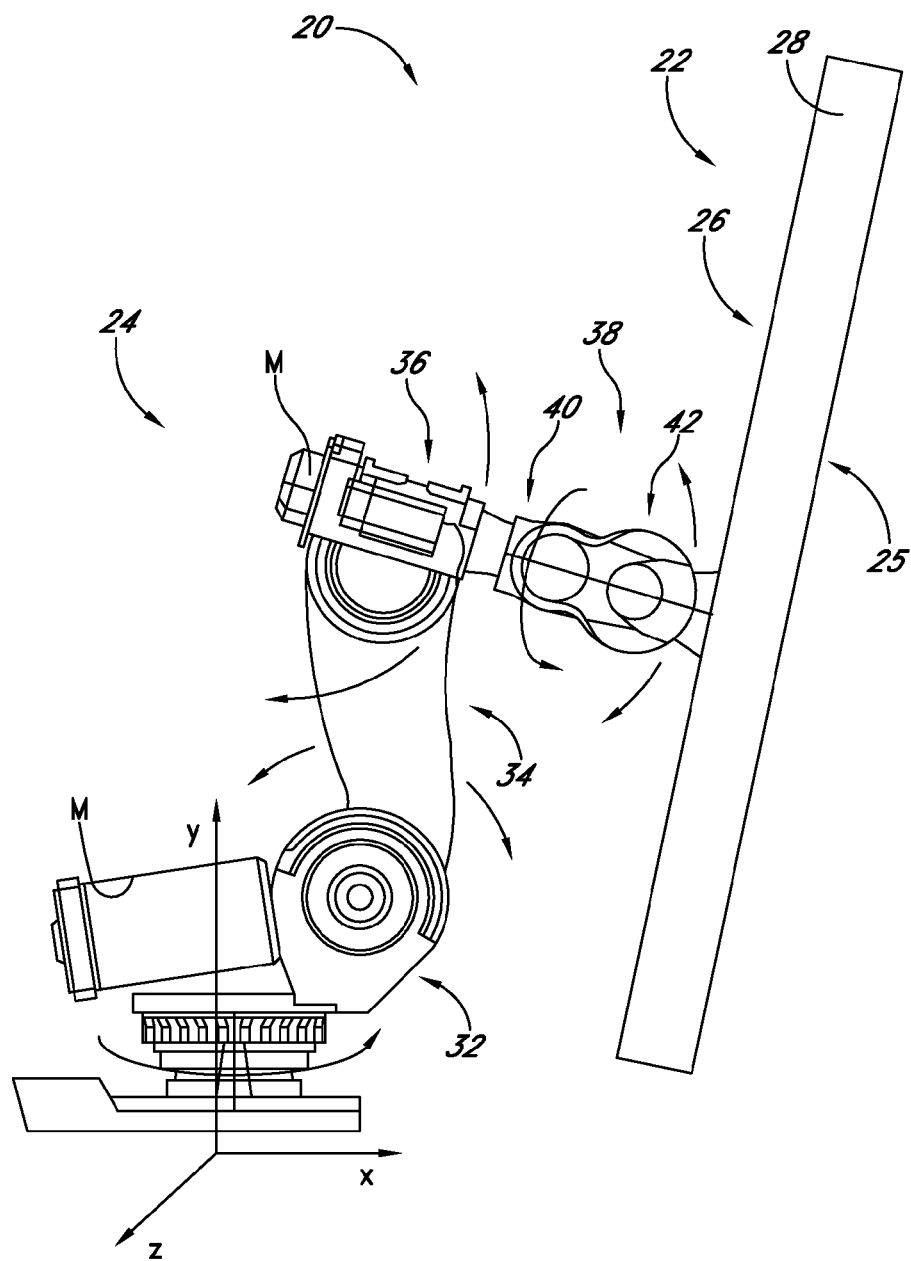
FIG. 1 is a side view of a robotically controlled electronic display in accordance with an embodiment of the invention.

FIG. 1 illustrates a robotically controlled electronic display 20 in accordance with an embodiment of the invention. As illustrated, the robotically controlled electronic display 20 comprises at least one electronic display 22 and a robotic or moveable display mount 24. In a preferred embodiment, the electronic display 22 is a thin-panel type display, such as an LCD, LED, plasma or similar display (whether now known or later developed). In one embodiment, the electronic display 22 has a front or viewing side 25 and an opposing rear side 26. The electronic display 22 has a peripheral edge 28.

In one embodiment, the electronic display 22 is generally rectangular in shape, but the display 22 may have a variety of shapes. The electronic display 22 may have a display area at the front side 25, which display area is enclosed by a bezel, frame or the like. The display area comprises the portion of the electronic display 22 which is capable of displaying information.

In a preferred embodiment, the electronic display 22 is relatively large, such as for viewing by person situation remotely there from. The electronic display 22 may be 20 inches in diagonal size (of display area), more preferably at least 36 inches in diagonal size, and even more preferably a least 50-60 inches or more in diagonal size. The electronic display 22 might comprise a single electronic video display or more than one display (such as two or more displays which are closely located or joined together). The electronic display 22 may be of various types such as CRT, LED, LCD, plasma, etc. and may include touch-screen features, such an overlying touch-sensitive screen.

The electronic display 22 is supported by the robotic mount 24. In a preferred embodiment, the robotic display mount 24 is moveable, thus permitting the position of the electronic display 22 to be changed. As detailed below, in a preferred embodiment, the position of the electronic display 22 can be changed freely anywhere in three-dimensional space (not merely one or two dimensions, but in full three dimensional space).

In a preferred embodiment, the robotic mount 24 is referred to as "robotic" because it is a device which can change positions without direct manual input. In particular, the robotic mount is preferably capable of multiple movements without manual intervention (i.e. move between various positions based upon a sequence of instructions without each movement being prompted by individual user input). Preferably, the robotic mount comprises a robot or robotic arm which is moveable in at least three (3), and preferably six (6) degrees of freedom, whereby the arm can thus change the position of the display in at least two (2), and preferably three (3), dimensions.

FIG. 1 illustrated one embodiment of a robotic mount 24. In one embodiment, the robotic mount 24 comprises a base and a display support. The base is configured to connect or support the display mount and associated display to a support, and the display support is preferably movable relative to the base, thus permitting an associated display to be movable relative to the base and the associated support.

Referring to FIG. 1, the base 30 may have a variety of configurations, including various shapes and sizes. In general, the base 30 is configured to be mounted to or supported by (by connection or merely resting or setting upon) a support surface, such as a wall, floor or other support, such as a portion of another object. The base 30 may have a generally planar bottom or lower surface for engaging a generally planar support surface, or may have other configurations for engaging support surfaces of other shapes. In one embodiment, the base 30 may include one or more apertures for accepting fasteners which are placed into engagement with the support surface, for securing the base 30 in a fixed position by temporarily or permanently connecting the base 30 to that surface.

In a preferred embodiment, a movable support is positioned between the base 30 and the electronic display 22. This support is preferably moveable in at least three (3), and preferably six (6) degrees of freedom, and is thus movable in two (2), and more preferably three (3), dimensions or dimensional space. By two or three-dimensions it is preferably meant the standard Cartesian two or three-dimensional space, such that the support is capable of moving the display about, or relative to, at least two of an 'x', a 'y' and a z' axis. In a preferred embodiment, movement is permitted in all three dimensions. As disclosed below, the robotic mount 24 may permits redundant movement in one or more directions. For example, the robotic mount 24 may include two or more elements which permit it to be moved in the x, y and/or z direction, and to rotate about the x, y and/or z axis.

As illustrated, in one embodiment, the robotic arm includes a main support 32. In one embodiment, the main support 32 is mounted for rotation relative to the base 30, i.e. about the y-axis as illustrated in FIG. 1. The main support 32 may be mounted, for example, on a bearing supported shaft which is connected to the base 30, or by other means.

In one embodiment, a lower arm 34 is rotatably mounted to the main support 32. As illustrated, the main support 32 has a first portion mounted to the base 30 and a second portion to which the lower arm 34 is mounted. In a preferred embodiment, the lower arm 34 is rotatably mounted to the main support 32 about a shaft or other mount. In the configuration illustrated, the lower arm 34 is mounted for rotation about a z-axis (i.e. an axis which is generally perpendicular to the axis about which the base 30 rotates).

As further illustrated, an upper arm 36 is rotatably mounted to the lower arm 34. In one embodiment, a first or distal portion of the lower arm 34 is mounted to the main support 32, and the upper arm 36 is mounted to a top or proximal portion of the lower arm 34. In one embodiment, the upper arm 36 is also mounted for rotation about the z axis.

In one embodiment, a head 38 is located at a distal portion of the upper arm 36. Preferably, the display 25 is mounted to the mount 24 via the head 38. In one embodiment, the head 38 is mounted for rotation relative to the upper arm 36 (and thus the remainder of the mount 24). In one configuration, a first portion 40 of the head 38 is mounted for rotation about an x axis relative to the upper arm 36 (i.e., about an axis which is perpendicular to both the y and z axes, and thus about an axis which is generally perpendicular to the axis about which the main support 32 and upper and lower arms 36, 34 rotate).

Further, in the embodiment illustrated, a second portion 42 of the head 38 is mounted for rotation relative to the first portion 40 and the upper arm 36, about the z-axis. As illustrated, the display 22 is mounted to the second portion 42 of the head 38.

The various portions of the mount 24 may be connected to one another in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the mount 24 might be mounted to one another in other fashions, however, such as by hinged mounting or the like.

Preferably, the mount 24 includes means for moving the one or more portions thereof, and thus the display 22 connected thereto. As illustrated, the mount 24 may include one or more motors M for moving the components thereof. The motors M may be electrical motors. In other embodiments, hydraulics or other means may be utilized to move one or more of the components of the mount 24. For example, a hydraulic arm might be utilized to move the upper arm 36 relative to the lower arm 34 in an up and down direction.

In one embodiment, the display 22 may be detachably connected to the mount 24, such as to permit the display 22 to be changed or serviced. The display 22 might be connected to a supporting frame, for example. That frame might then be connected to the mount 24, such as by connecting the frame to the head 38 with one or more fasteners.

As indicated, in a preferred embodiment, the mount 24 is configured to move the display 22 in three-dimensions, or combinations thereof. The particular configuration of the mount 24 may vary for accomplishing this task. For example, while the mount 24 described above is redundant in its capacity to move in certain directions (i.e. the upper and lower arms 36, 34 are both configured to move about the z axis), the mount 24 could be configured in other fashions (such as by having only a single portion configured to move in each direction). It will also be appreciated that the number of members or elements which the display mount comprises may vary. For example, the display mount might comprise a base and a head which is mounted to the based, such as via a swivel, permitting the head to be moved in at least two dimensions. Various configurations of members may also be utilized to effect movement in various directions. For example, aside from swivels or the rotating connections of the display mount illustrated in FIG. 1, members may be configured to telescope, slide or otherwise move linearly (i.e. move along an axis rather than about an axis), or be configured to move along paths other than curved paths. For example, the mount 24 may be configured to move about the "x" axis, such as to permit the display to be tilted up and down, to move about the "y" axis, such as to permit the display to be swiveled from side to side, and to simply move along the "z" axis, such as to permit the display to be moved in and out (such as towards or away from a wall/viewer).

In the embodiment illustrated, a single display 22 is connected to a single mount 24. In another embodiment of the invention, referring to FIG. 2, a unitary display 122 may comprise a plurality of individual or independent displays 22 located in proximity to one another. In one embodiment, one or more of those individual displays 22 may be mounted to a mount 24, and thus be configured for movement.

Figure 2:
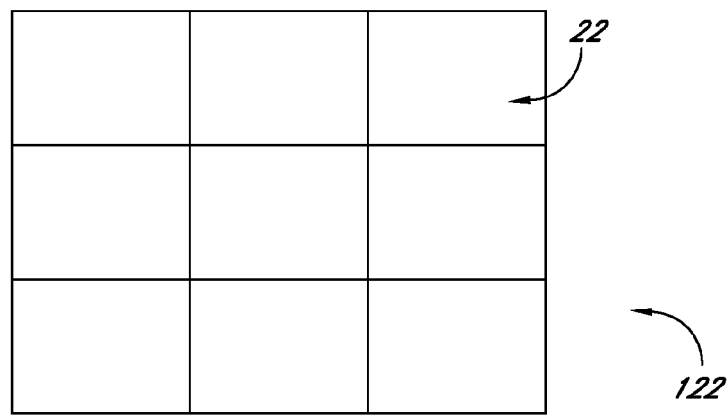
FIG. 2 illustrates a robotically controlled unitary display comprising a plurality of individual displays in accordance with another embodiment of the invention.

Two or more robotic mounts 24 may be used with one another. FIG. 2 illustrates one embodiment of a unitary display 122 comprising nine (9) displays 22. All nine displays 22 are preferably mounted to an associated mount (not shown). In this manner, each of the nine displays 22 may be moved by their associated mount.

FIG. 2 illustrates the displays 22 in an orientation where they are located adjacent to one another in a matrix, and in a common plane. In the configuration illustrated, there is a central display surrounded by top, bottom, side and corner displays.

Figure 3:
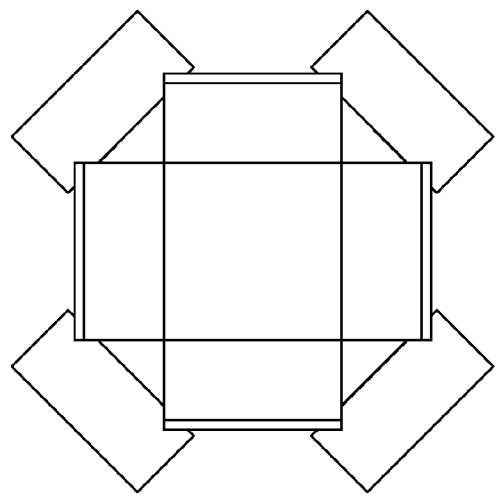
FIG. 3 illustrates the unitary display of FIG. 2 with various of the individual displays moved into different positions.

The displays 22 may be moved, however, to other locations and thus other orientations or positions relative to one another. For example, FIG. 3 illustrates the displays 22 in a flower configuration where the top, bottom and side displays are tilted forward relative to the plane which contains the central display. The corner displays are rotated and then similarly tilted inwardly. In this configuration, the displays are positioned like the slightly closed pedals of a rose or other flower.

Figure 4:
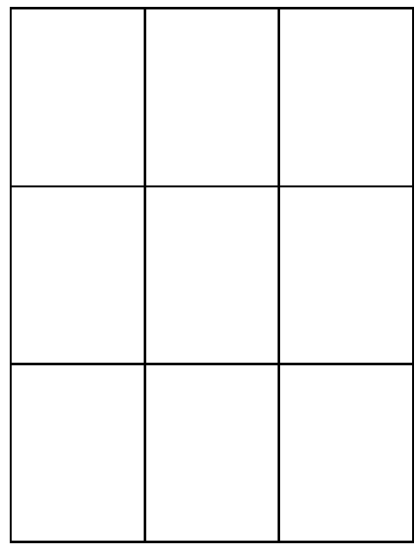
FIG. 4 illustrates the unitary display of FIG. 2 with the individual displays moved into different positions.

FIG. 4 illustrates the displays 22 again arranged in a matrix and in a single plane. However, in this configuration, the displays 22 have all been rotated 90 degrees, so that the unitary display 122 is taller than wider.

In one embodiment, each display 22 of the unitary display 122 has an associated robotic mount. In this manner, each display 22 may be moved independently of the other. In another embodiment, multiple displays may be coupled to or otherwise associated with a single mount (such that groups of displays are movable together). In yet another embodiment, one or more of the displays 22 may be fixed and others may be connected to a mount 24 for movement.

In one embodiment, means may be provided for controlling a single mount (such as illustrated in FIG. 1) or one or more or all of a plurality of mounts associated with a unitary display (such as illustrated in FIG. 2). In one embodiment, one or more mounts may be controlled by a controller. The controller might comprise, for example, an electronically or mechanically operated controller.

In a preferred embodiment, the controller may comprise or include a computing device. Various instructions may be provided from the controller to the one or more robots/robotic mounts, causing the robots/robotic mounts to move. For example, a user might provide an input to the controller, which input is a request to move a particular display from a first to a second position. The controller may generate one more signals or instructions which are transmitted to the required mount for causing the mount to so move the display. The signal might comprise opening of a switch which allows electricity to flow to one or more motors for a predetermined period time which is necessary for the motor to effect the desired movement. In another embodiment, the signal might comprise an instruction which is received by sub-controller of the mount, which sub-controller then causes the mount to move as desired.

In one embodiment, the controller may be configured to cause a single mount or multiple mounts to move in various patterns or other desired directions. For example, the controller might be programmed to cause the displays to move in a particular pattern. Referring to FIGS. 2-4, for example, the controller may be configured to move the displays from the position illustrated in FIG. 2 to that illustrated in FIG. 3 or 4, or vice versa. The controller may be custom-programmed or might be configured to execute pre-set sequences of movement. For example, the displays may be configured to move at certain times, into certain positions or in certain patterns, to move with music or the like (such music might be presented via speakers associated with the display or via a separate sound system or the like).

In one embodiment, the controller may include a processing unit capable of executing machine readable code or software. As indicated, that software may comprise a set of instructions which, when executed, cause the controller to move one or more displays in a predetermined motion or pattern, randomly or otherwise. The software might also or instead simply comprise a set of instructions which permits a user to provide manual input to cause a display or displays to move, either in direct response thereto or to generate a programmed movement (which may be implemented immediately or be stored for implementation at a later time).

The controller might communicate with the robotic mount via wired or wireless communications. For example, the controller might comprise a desk-top computer running a control program. The desk-top computer might transmit signals via a RS-232 communication link including a wired pathway to the motor or controller of the robotic mount. Alternatively, the desk-top computer and display mount controller might both include wireless transceivers. In this manner, the controller and robotic mount(s) may be located remotely from one another. The same computer might output images or a video feed to the one or more displays.

In one embodiment, video information may be transmitted to the display or displays either independently of control instructions or dependently therewith. For example, the controller may be configured to both generate display information and/or transmit display information to the displays, and control the mounts. The controller might be configured to move the mounts/displays based upon the information which is displayed by the one or more displays. In one embodiment, the one or more displays may be moved synchronously with information displayed by the displays. For example, the displays might be moved synchronously with images displayed by the displays or with music or other accompanying information.

The invention has numerous advantages. One aspect of the invention is a movable display. The display may preferably be moved in three-dimensions (i.e. about three axes which are all perpendicular to one another). In one embodiment, the display is mounted to a display mount having a display support which is movable in three dimensions. Preferably, means are provided for automatically or remotely moving the display. As indicated, this may comprise changing the position of one or more portions of the robotic mount.

One aspect of the invention is a method of remotely or automatically changing the position of a display. For example, a display may be mounted to a wall or ceiling in a public area and the position of that display may be changed at various times in an automatic fashion (as opposed to manual manner, where the position is changed by a person physically moving the display or its associated mount). This has the advantage that the position of a display may be moved for various purposes, such as for entertainment, for optimizing viewing angle, for directing information to viewers in certain locations or areas, or for other reasons. The display might also be mounted to a wall of a home and be controlled by a user to change the viewing position of the display.

Figure 5:
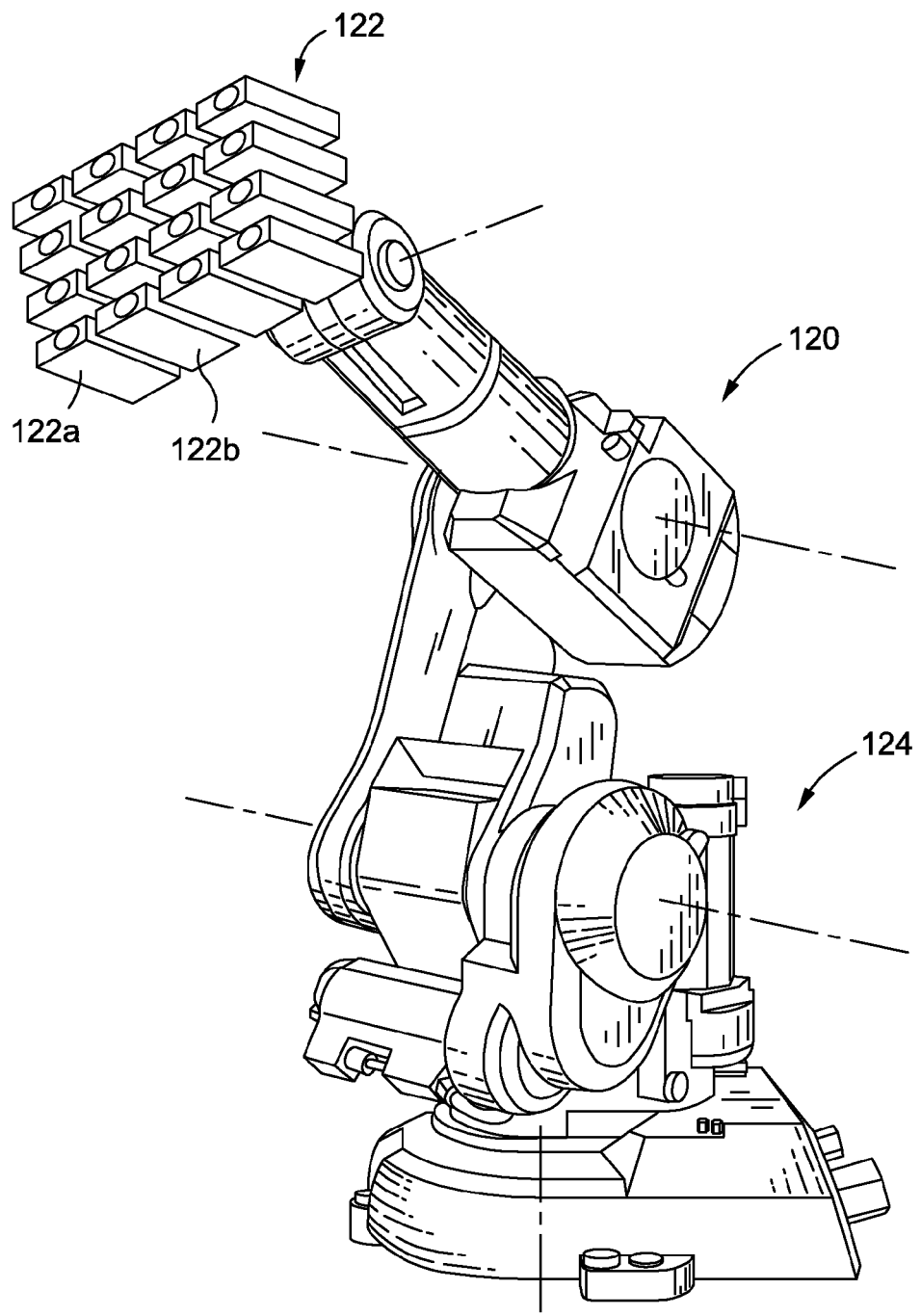
FIG. 5 illustrates a robotically controlled video projector in accordance with an embodiment of the invention.

Another embodiment of the invention is a robotically controlled projector 120. FIG. 5 illustrates one embodiment of a robotically controlled projector 120. Preferably, the robotically controlled projector 120 comprises at least one projector 122 and at least one robotic mount 124. The projector 122 may be of a variety of types now known or later developed. Preferably, the projector 120 is configured to project one or more images or a sequence of images (video) onto one or more surfaces. For example, the projector 120 might comprise a digital light processing ("DLP") projector, a CRT, LCD, or other type of projector. In one embodiment, the robotically controlled projector 120 includes a single projector. However, as illustrated, it might include a number of projectors 122a, 122b, etc.

The robotic mount 124 preferably comprises a robot or robotic arm similar to that described above and will thus not be described herein again in detail. In particular, the robotic mount 124 is configured to move the at least one projector 122 in three (3), and preferably six (6) degrees of freedom, and thus in at least two (2), and preferably three (3) dimensions/dimensional space. As also indicated above, the robotically controlled projector 120 may also include a controller. The controller may be configured to cause the projector 122 to display images or video at certain times, and may be configured to cause the robotic mount 124 to move the projector 122, such as in certain paths.

The projector 122 is preferably mounted to the robotic mount 124. The mount 124 may be used to move the projector 122, thus causing the projector 122 to display images or video at various locations. For example, a robotically controlled projector 120 might be located in a lobby and be used to display various information or images upon a screen or another projection surface such as a wall, a floor or the like. The robotically controlled projector 120 might be used in a theater to project background images or the like.

It will be appreciated that, like the robotically controlled display described above, more than one robotically controlled projector 120 might be used in tandem. For example, two robotically controlled projectors 120 might each have a single projector 122. The two robotically controlled projectors 120 may be configured to move in various patterns together or independent of one another, such as to show joint images, synchronous images or the like.

Of course, various other of the features of the robotically controlled display 20 described above may be applied to the robotically controlled projector 120.

In one embodiment, the content of video or other information which is projected by the robotically controlled projector 120 may be registered to multiple surfaces upon which the information is projected. For example, information may be projected by the robotically controlled projector 120 onto one wall of a theatre, then the ceiling and then an opposing wall, such as when an image of a character is projected so that it appears the character is moving up one wall, across the ceiling and down the other wall of the theatre.

Figure 8:
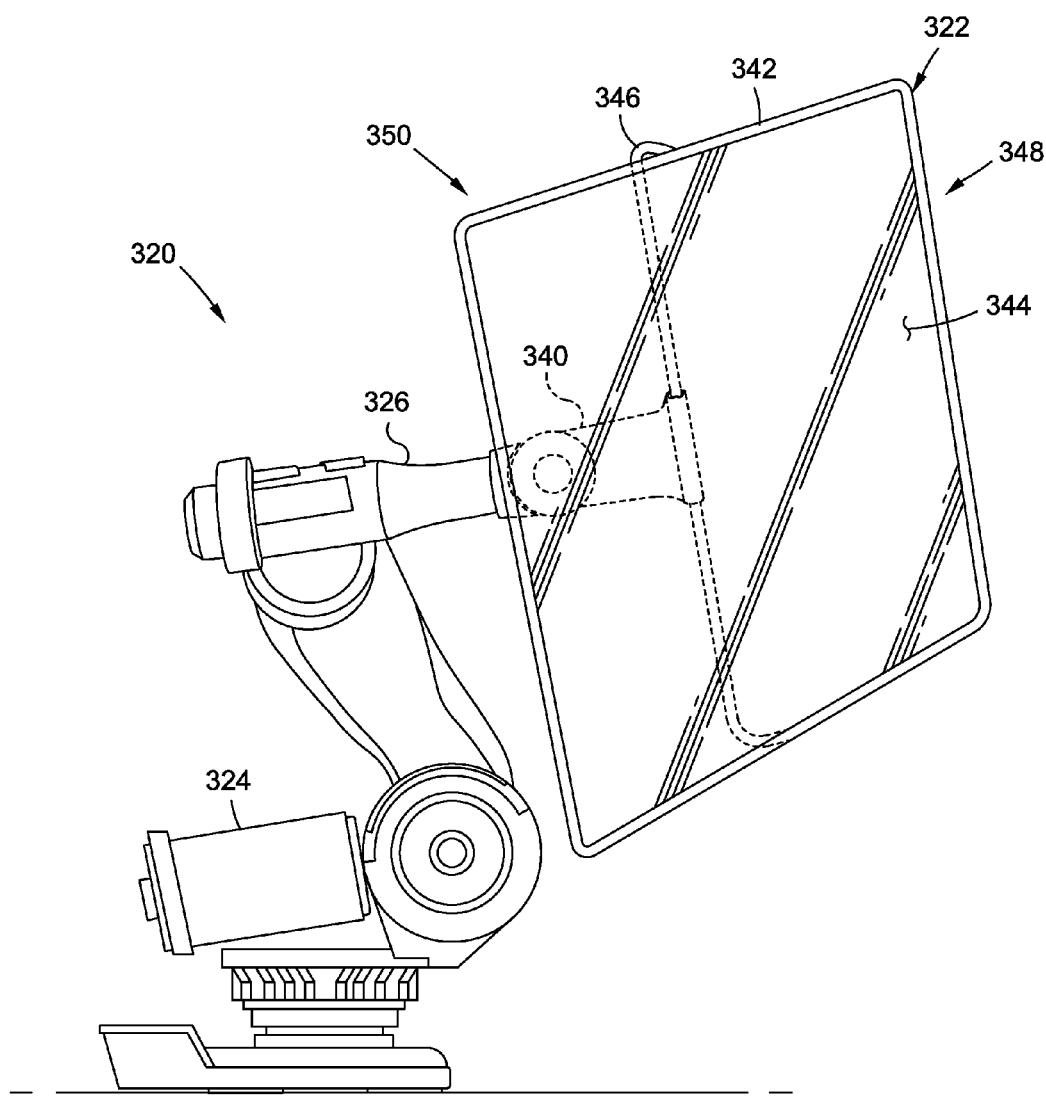
FIG. 8 illustrates a robotically controlled screen in accordance with an embodiment of the invention.

In another embodiment, one or more surfaces upon which the video or other information is registered are robotically controlled projection screens. FIG. 8 displays an embodiment of a robotically controlled projector screen. Such robotically controlled projector screens can cause the projector screen to be moved by a similar type robotic mount. This embodiment will be discussed in detail, below.

Of course these principles may be applied to various settings. For example, the projection surface(s) could vary. While the surfaces might be associated with the exterior of the building, they could be the exterior of a building or other structure, the ground, or other architectural elements, whether natural or man-made.

Figure 6:
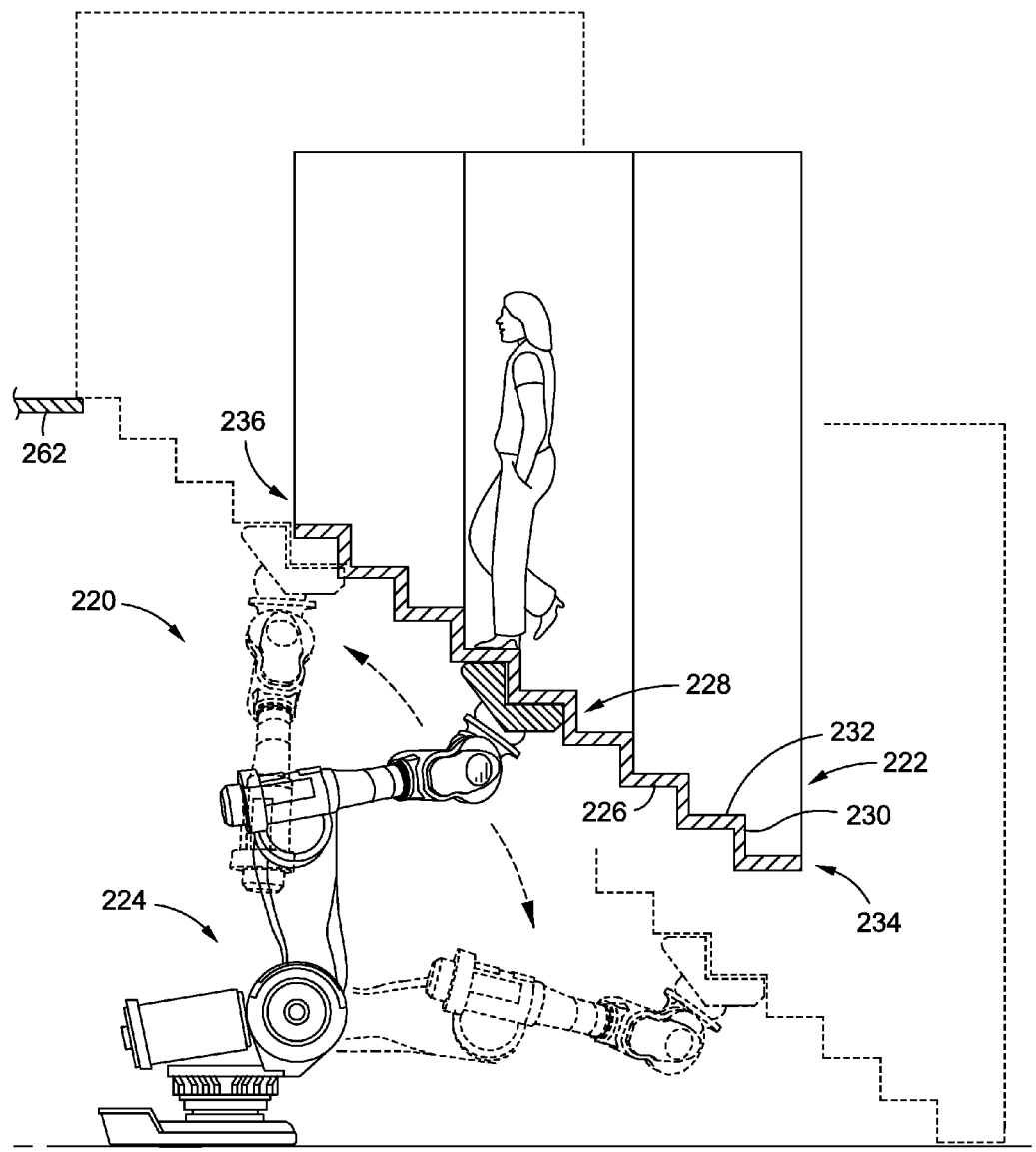
FIGS. 6 and 7 illustrate a robotically controlled staircase in accordance with an embodiment of the invention.
Figure 7:
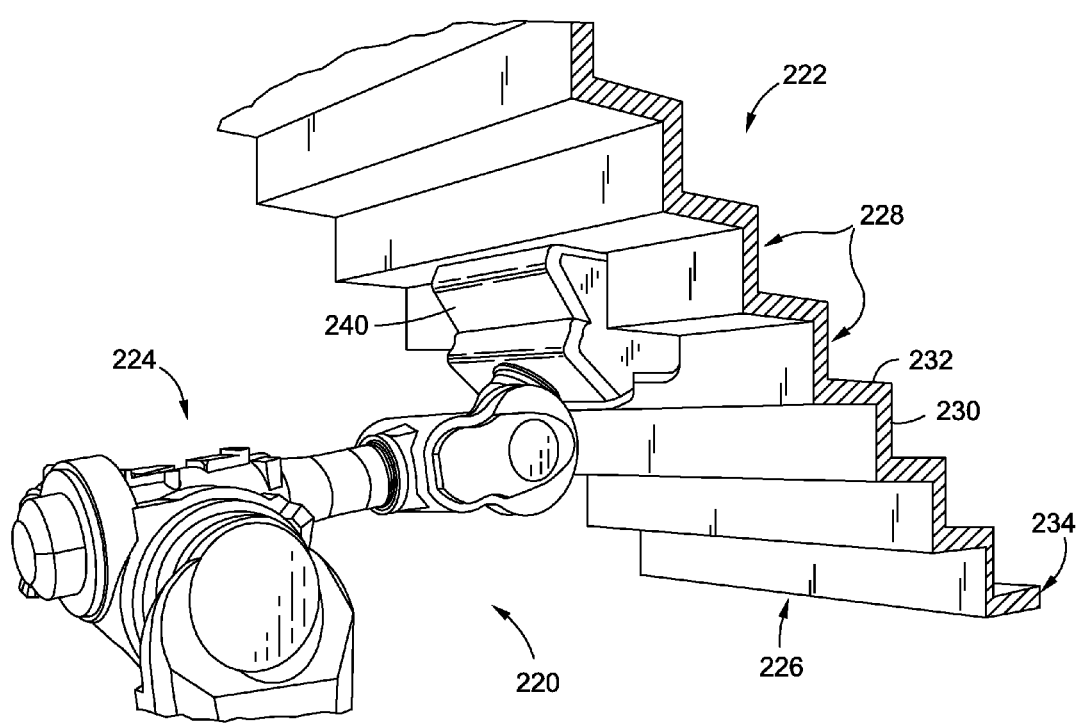

Yet another embodiment of the invention comprises a robotically controlled staircase 220. FIGS. 6 and 7 illustrate a robotically controlled staircase 220. The robotically controlled staircase 220 comprises a staircase 222 and a robot or robotic mount 224 which is configured to move the staircase 222.

The staircase 222 may have various configurations. In one embodiment, the staircase 222 comprises a supporting body or structure 226. The staircase 222 preferably includes a plurality of steps 228. Each step 228 may comprise a riser 230 and a landing 232. Each riser 230 preferably extends generally vertically upward. The number of steps 228, and thus the number of risers 230, may vary. Preferably, there is at least one step 228. More preferably, however, there are a plurality of steps 228. The depth of each landing 232 and the height of each riser 230 may be configured to conform to local building or other codes.

Preferably, the staircase 222 has a first or bottom end 234 and a second or top end 236. The top end 236 is preferably higher than the bottom end 234. The total change in elevation is dependent upon the number of steps 228 and the height of the risers 230. The staircase 222 may be straight or it might be spiral, have one or more bends or the like.

In one embodiment, the staircase 222 may be configured to mate with one or more other elements or structures. For example, the staircase 222 may be configured to dock or mate to a supporting platform (not shown). To this end, the top end 236 and bottom end 234 of the staircase 222 may end or terminate in a landing 232. This allows the top and bottom ends 236,234 to rest upon a supporting surface or platform at generally the same elevation thereof. In one embodiment, the landing at the top end 236 and/or bottom end 234 of the staircase 222 may be larger than the step landings 232. For example, each of the top and bottom end landings may be sufficiently large to permit one more persons to easily stand thereon (whereas the step landings are primarily configured to permit a user to simply step thereon as they climb the staircase).

In one embodiment, the staircase 222 may include other features. For example, the staircase 222 may include one or more handrails (not shown). The staircase 222 has a width between opposing sides. This width may vary, such as being 36 or 48 inches, for example. A handrail may be located at each side of the staircase to prevent a user from falling off of the staircase and to provide support to users. Likewise, the landing 232 at the top end 236 and bottom end 234 of the staircase 222 may include an enclosure. Such an enclosure may be selectively opened and closed to permit ingress to and egress from the staircase, but prevent such during movement of the staircase. Such an enclosure might comprise a rail, a chain, or the like. For example, a swinging gate may be located at both the top and bottom ends 236,234 of the staircase 222 to control ingress to and egress from the staircase 222.

In one embodiment, the body 226 of the staircase 222 might comprise a superstructure which supports the steps 228. For example, the body 226 might comprise a metal framework. The steps 228 might be constructed from wood and be supported by that framework. In another embodiment, the body 226 might define the steps 228. For example, the staircase 222 might be constructed from metal, such as step elements which are welded to one another to form a unitary structure.

The mount 224 preferably comprises a robot or robotic arm similar to that described above and will thus not be described herein again in detail (for example, such may comprise a base and a moveable support, as detailed above). In particular, the mount 224 is configured to move the staircase 222 in at least two (2), and preferably three (3) dimensions. As also indicated above, the robotically controlled staircase 220 may also include a controller to move the staircase 222 in certain paths.

As best illustrated in FIG. 7, the staircase 222 is preferably mounted to the mount 224. As illustrated, an adaptor 240 may be used to connect the staircase 222 and the robotic mount 224. The adaptor 240 may have various configurations. FIG. 7 illustrates one configuration in which the adaptor 240 engages a bottom portion of one or more of the steps 228. However, the adaptor 240 could have other configurations, such as depending upon the configuration of the staircase 222, including the body 226 or supporting structure thereof.

As illustrated in FIG. 6, the robotic mount 224 is configured to move the staircase 222 between various positions.

For example, the robotic mount 224 may move the staircase 222 into a position in which its bottom end 234 is positioned on the ground. A user may then step onto the staircase 222 from the ground, such as by stepping onto a lower landing 232 thereof.

The robotic mount 224 may then be used to move the staircase 222, and the user standing thereon, to another location. In the preferred embodiment where the robotic mount 224 can move in three dimensions, the staircase 222 may be moved to various positions in three-dimensional space which vary from an initial or starting position. FIG. 6 illustrates one simplistic embodiment where the staircase 222 is moved in two dimensions: upwardly and forwardly. In this example, the staircase 222 may be moved upwardly and forwardly, such as to dock with a raised platform 262. A user might then disembark from the staircase 222 onto the platform 262.

It will be appreciated that a user may climb up and down the steps 228 of the staircase 222 both while the staircase 222 is stationary and/or while it is moving. For example, a user might board the staircase 222 at the bottom end 234 while it is stationary. As the staircase begins to move to a destination, the user might climb the steps 228 to the top end 236 of the staircase 222 to disembark the staircase 222 at the destination.

The robotically controlled staircase 220 might be used in various manners. For example, it might be used in a theater. In such an environment a singer might be transported from stage level to a platform well above stage, or from one location to another over a barrier such as a moat. The robotically controlled staircase 220 might also be used as an amusement ride. In such an embodiment, patrons might board the staircase 220 as a ride and be transported from one location to another. In one preferred embodiment, a haunted house ride might include one or more platforms in various locations. The platforms might lead to doors or other points of entry. Patrons might board the staircase and be transported to one or more of those platforms where they disembark to travel into other portions of the haunted house. In one embodiment, the staircase might move between various locations before stopping, thus providing substantial anticipation to the riders as to their final destination. It is also possible for there to be more than one robotically controlled staircase 220. The various staircases 220 might move independently between various locations. They might also move so that they join together at certain times (forming longer staircases to connect to various locations, for example) or independently at other times). As yet another example, a first robotically controlled staircase 220 might be used to move patrons from ground level to one or more platforms at a first level (above ground) and then a second robotically controlled staircase 220 might be used to move patrons from the first level to an even higher second level (or higher).

As indicated, one or more controllers may be used to control the robotically controlled staircase 220, such as to cause it to move between various locations. The patterns of movement may change over time. For example, in a haunted house ride, the robotically controlled staircase 220 might be configured to move a first set of riders from ground level to a first platform. However, the robotically controlled staircase 220 might be configured to move a second set of riders from that same ground level to a second, different platform.

Of course, the robotically controlled staircase 220 might be configured to move between various locations other than ground level and various platforms. The robotically controlled staircase 220 may include several of the other features detailed herein. For example, the robotically controlled staircase 220 may be controlled by one or more controllers, such as to move in certain patterns or paths, including synchronously with other elements. For example, the robotically controlled staircase 220 may be moved synchronously with music which is being played or with images that are being displayed.

As indicated above, another embodiment associated with movable entertainment elements is that of a robotically controlled projector screen. Referring once again to FIG. 8, an embodiment of a robotically controlled projector screen 320 is shown. The robotically controlled projector screen 320 comprises a projector screen 322 and a robotic mount 324 which is configured to move the projector screen 322. The projector screen 322 is attached to the robotic mount 324 through a robotic arm 326 similar to that described above and will thus not be described herein again in detail (for example, such may comprise a base and a moveable support, as detailed above). In particular, the robotic mount 324 is configured to move the projector screen 322 in at least two and preferably three dimensions. As also indicated above in relation to the electronic display and robotically controlled projector, the robotically controlled projector screen 320 may also include a controller (not shown) to move the projector screen 322 in certain paths or positions in accordance with a pre-defined software program.

As best illustrated in FIG. 8, the projector screen 322 is preferably mounted to the robotic mount 324. An adaptor 340 may be used between the robotic arm 326 and the projector screen 322 to connect the projector screen to the robotic mount 324. The adaptor 340 may comprise various configurations and may depend on the support structure 342 used with the projector screen 322.

The support structure 342 can be fashioned in any manner sufficient to support the screen surface 344 of the projector screen 322 so that the screen surface is enabled to provide a surface area sufficient to register the video, graphic or other information emanating from a projector. Such support structures might comprise a bracketed wooden framework, a metal frame, or it could be formed using a network of PVC pipes or the like. In the embodiment shown in FIG. 8, the adaptor 340 is firmly attached to a central support bar 346. The attachment point is preferably engaged at the center of the central support bar 346 to provide optimum stability to the projector screen 322, and is attached through any attachment means known in the art.

The screen surface 344 is arranged to entirely cover the front portion 348 of the projector screen 322 and set taut to prevent folds in the material and to best provide a smooth, consistent surface for viewing without any imperfections transferred to the image through such folds. Material used for the screen surface would possess properties best suited for reflecting light with minimal alteration. Such materials might comprise white blackout cloth, any material painted over with a reflective, white paint, white vinyl and white spandex. The latter material—spandex—possesses the property of elasticity, and is used in a preferred embodiment, which will be further discussed, below.

Depending on the material, the screen surface 344 may be attached to the front portion 348 of the support structure 342 through any attachment means known in the art, such as adhesives, nails, staples, Velcro, tacks or the like. Screen surfaces that have sufficient elasticity might be stretched to the back portion 350 of the support structure to tightly envelop and wrap around the support structure, and thereby help to provide a taut, consistent, and uniform surface.

Figure 9A:
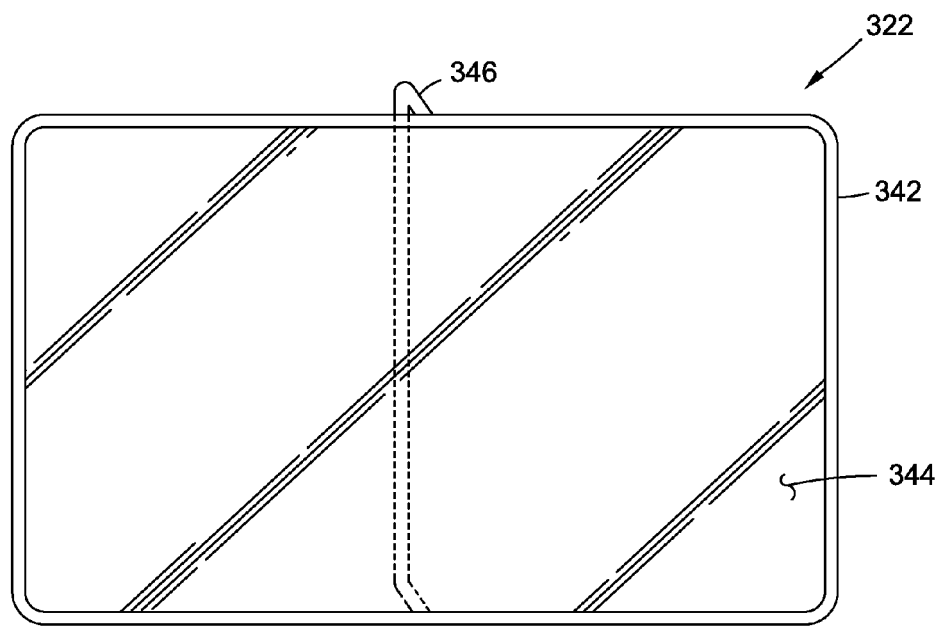
FIG. 9a illustrates a unitary screen in accordance with an embodiment of the invention.
Figure 9B:
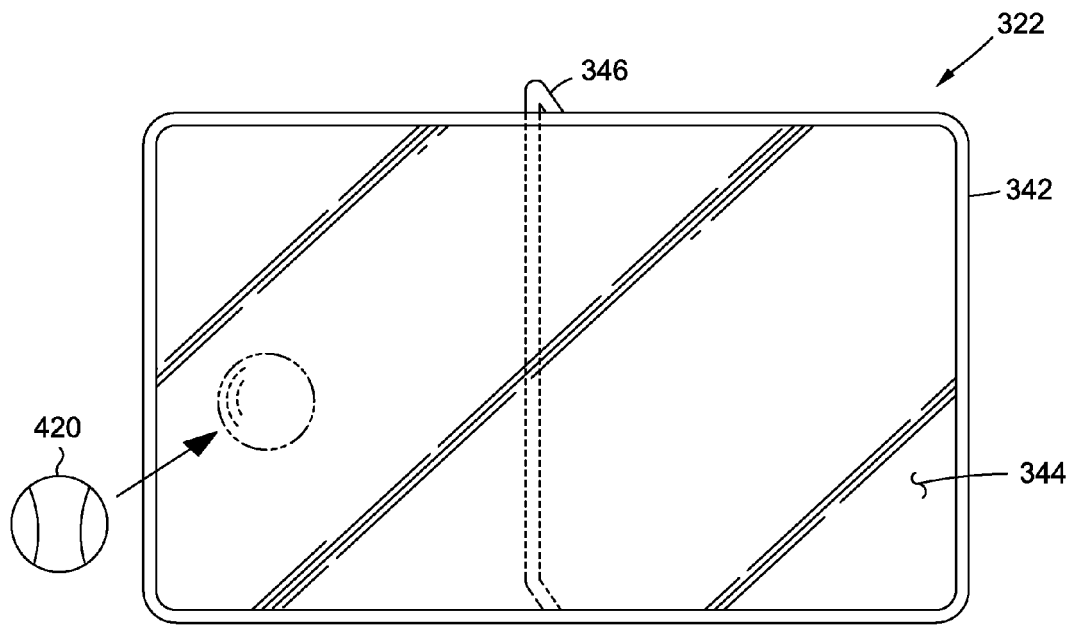
FIG. 9b illustrates the elastic nature of a unitary screen in accordance with an embodiment of the invention.

FIG. 9 provides a closer look at the projector screen 322. In a preferred embodiment, the projector screen 322 uses a screen surface 344 made of an elastic material, such as spandex. In its static or expanded (i.e. stretched) form, the screen surface is flat, as is typical of most projector screens. This is shown in FIG. 9(a). Through the use of spandex or other elastic material, the screen surface can be manipulated into various shapes and forms. An example of this is depicted in FIG. 9(b). In FIG. 9(b), a round object such as the ball 420 is pushed into the screen surface 344 from the back portion 350 of the projector screen 322, thereby pushing the elastic screen surface out in a manner consistent with the shape of the ball. As will be described, such forming or manipulation of the screen surface 344 can provide a unique and dynamic viewing experience that can be easily changed from one form to another in a relatively quick manner.

It should be understood that although a ball 420 is shown in FIG. 9(b) to depict modification to the flat screen surface 344 of FIG. 9(a), any objects and multiple objects could be used to form any type of "landscape" to the screen surface. For instance, a section of a cylinder could be used to provide a convex shape across the entire screen surface 344. Further, a number of triangular and/or cone-shaped objects could be positioned on the back portion 350 of the screen surface 344 to depict a landscape of hills, mountains or waves. Any number or types of shapes and forms that could be used to vary the surface of the screen surface 344. The projected image would preferably be consistent with the given "landscape" to enhance the imagery viewed by the persons viewing the projector screen 322.

In one embodiment, the robotically controlled projector screen's motion is controlled by the controller of the robotic mount 324 in a manner similar to that of the electronic display 22, and the projector 122. The robotically controlled projector screen 320 may therefore be moved from a first position to a second position through the controller in response to a signal stemming from the coded instructions stored in a memory storage unit and read by the processor. The movement to and from various positions can serve the purpose of placing the screen surface 322 in optimum position for viewing by the intended viewers to, for instance, reduce glare or to receive viewers at a location where they are best enabled to view the screen surface. The movements may also be controlled for the purpose of providing an entertaining element to the pattern of motion. For instance, the screen surface 322 may be programmed to move towards an audience when the projection displays an object, such as a baseball just hit by a batter, moving towards the audience. If the screen surface 322 is also moving towards the audience, an enhanced effect is achieved in showing the ball moving in their direction.

Figure 10:
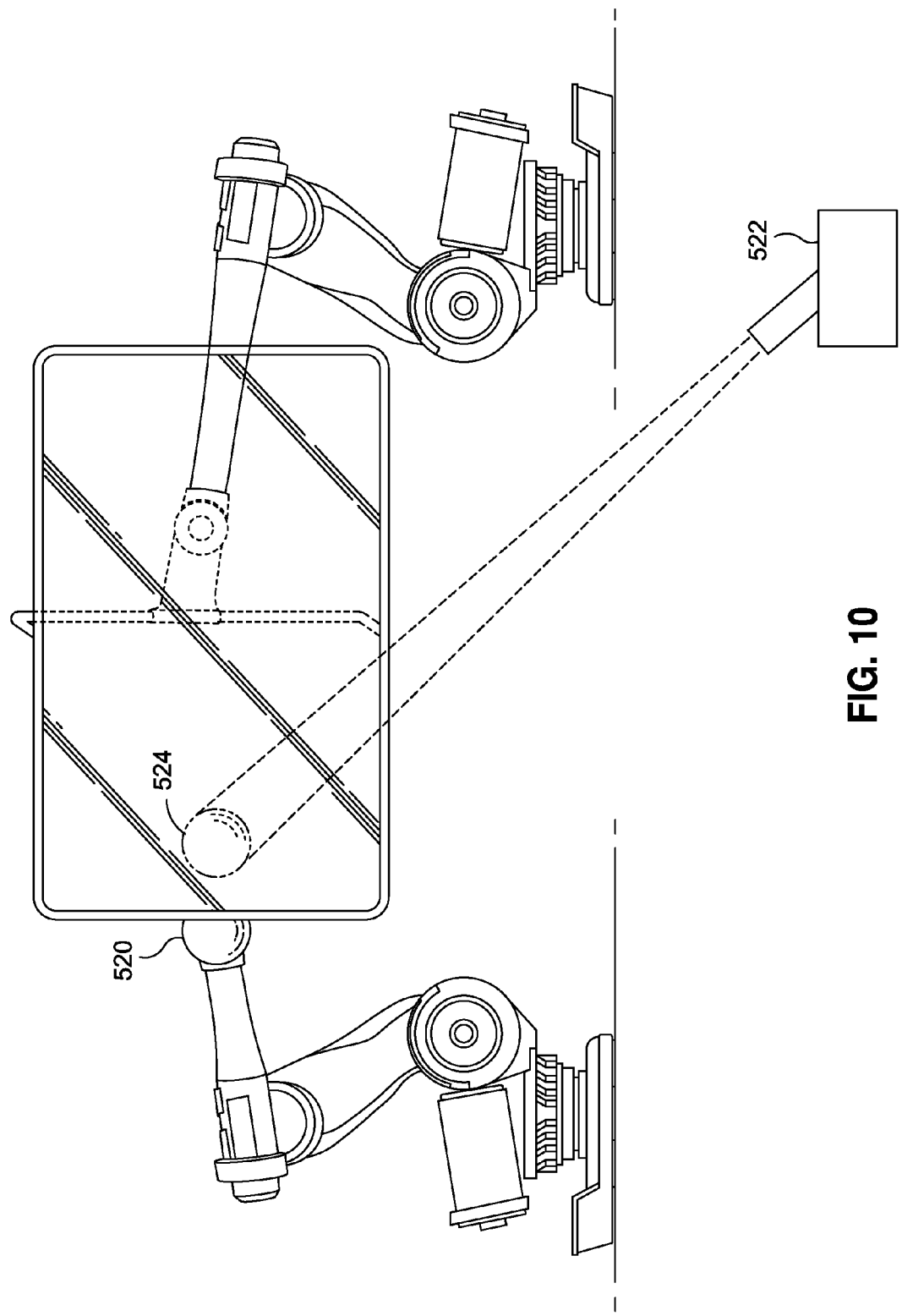
FIG. 10 illustrates a unitary elastic screen in use with a projector in accordance with an embodiment of the invention.

To further provide enhanced effects, as previously described, an elastic material, such as spandex, can be used as the material for the screen surface 344. Referring to FIG. 10, the ball 520 is shown being positioned into place. The ball 520 is then pressed into the back of the screen surface 344 at the same moment that a baseball, projected from a projector 522, is projected onto the protrusion 524 of the screen surface to accentuate the image of the projected baseball. The processing of movement can be established through the synchronization of timing between the images projected and the motion of a separate robotic mount used for pressing the ball 520 into the screen surface 344 at its intended position. Of course, alternatively, the ball could be manually pressed into the back of the elastic screen by an individual having an awareness of the timing and location for doing so. However, the use of a robotic mount for coordinating these activities automates the process, leaves little room for mistakes and creates a more entertaining arrangement of automated, mechanically moving machines to create the overall visual impression.

To accomplish synchronization, a time code is generated. The time code is typically established in the projector as an audio signal on an audio recording device, but may comprise any type of signal. The code can be broken down into a specific number based on hour, minute and second for each frame. For example, for a given frame, a certain display, such as the baseball being hit by the batter, might initiate at hour 2, minute 33, and second 42 associated of the 53 frame of the projected sequence. This may be defined as 023342000531, or some other readable string that accurately codes this specific information. If the projector renders thirty frames per second, the granularity in coordination with other activities can be very precise. The separate robotic mount controlling the ball 520 is provided the same time code and both that of the projector and separate robotic mount controlling the ball are initiated at the same moment. Therefore, when the ball is projected as being hit by the batter, the ball 520 is moved into position by the separate robotic mount so that the projection and screen surface 344 coordinate in synchronicity. The coded instructions in the separate robotic mount instruct the controller to move the ball 520 into the respective position when the applicable time code is read. The coded instructions might also provide the controller instructions as to the precise location of placement, rate of placement and when to remove the ball 520 from the screen surface 344.

The above described example is but one of many. Nearly any object can be pressed into the back of the screen surface 344 to impress on the screen surface a myriad of different volumetric shapes for accentuating images projected on to the screen surface by a projector. Additionally, though the above embodiment was described in terms of a separate robotic mount moving the ball 520 into position behind the screen surface 344, it is conceivable that this could be performed by an individual, by the robotic mount absent timed computer code instructions to coordinate with the projector, or by any other means.

Using a time code synchronized and initiated concurrently between various devices, a number of other entertaining features can be deployed by the robotically controlled projector screen 320 or by multiple robotically controlled projector screens. FIG. 11 shows a sequence of synchronized movements coordinated as between each of two robotically controlled projector screens 620(a) and 620(b) and two robotically controlled projectors 624(a) and 624(b). The movements are coordinated using computer coded instructions sent to the controller of the respective devices. The timing of specific motions of each of the devices is initiated in accordance with pre-defined time codes. Each of the computer coded instructions for each of the respective devices is initiated simultaneously or in a pre-defined sequence. The initial time code in this example for each of the devices, if their respective instructions were simultaneously initiated, would be 0101010000001, indicating in this example the first second of the first minute of the first hour with respect the first frame of the video for each of the devices, if their respective programs were simultaneously initiated. All of the devices are therefore pegged to the display presented on at least one robotically controlled projector screen. It should be noted that the hour/minute/second sequencing is not literal in this example, but is merely one of many means for apportioning segments of time in relation to a given frame of a video sequence. Upon the occurrence of various time codes, instructions are sent to the controller of a respective device to perform a particular motion or set of motions. The initiation of the time code at each of the devices can be manually established by mechanically opening a switch or, preferably, through remote wireless or wired electronic means.

FIG. 11(a) illustrates an embodiment of the invention. Each of two robotically controlled projectors 624(a) and 624(b) separately display a video image on each of two robotically controlled projector screens 620(a) and 620(b). The image is of a school of fish on screen surface 644(a) of projector screen 620(a) and is of a calm ocean environment showing a relatively small area of space above the surface on the screen surface 644(b) of projector screen 620(b). Each of the devices operates at that moment in accordance with instructions respectively assigned to each device based on a specific time code 628. Such "operation" may be an instruction to remain static or may be no instruction, thereby establishing a lack of motion in the respective device; or it may be an instruction sent to the robotic arm to position the respective device, be it all or any of the projector screens 620(a) and 620(b) or the robotic projector 624(a) and 624(b).

Figure 11C:
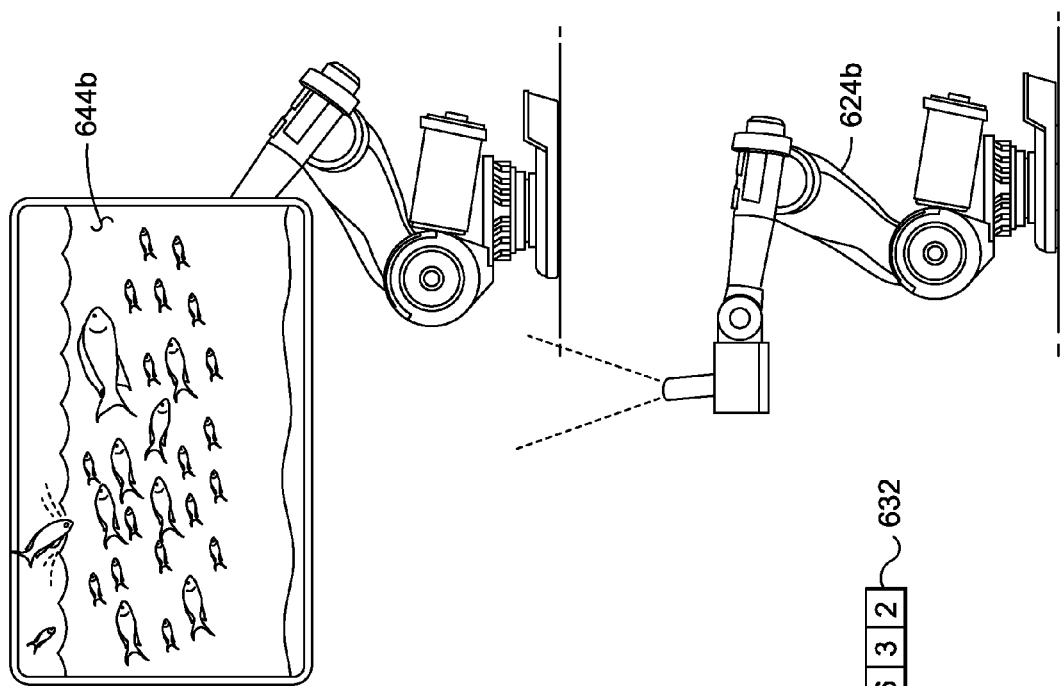
Figure 11C:
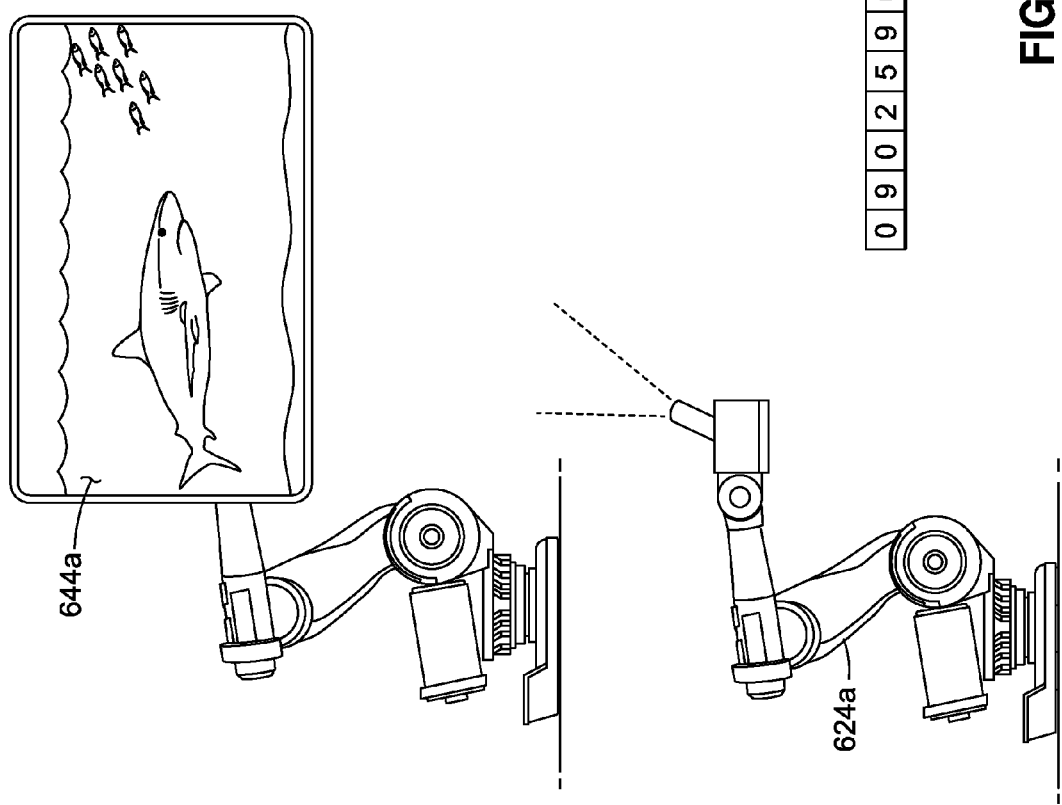

As illustrated in FIG. 11(b), the video display shows the fish starting to swim faster with one breaching the water. The robotically controlled projector 624(a) is sequenced at this moment to move the robotic arm in an upward motion at the same time that the video projection shows more area of space above the surface of the water with the breaching fish above the surface. In this manner, it appears that the projector screen 620(a) is actually a viewer moving upwards to show the fish breach the surface of the water; following the fish's path and trajectory. The ocean setting remains the same but a different perspective is provided. Thus, the ocean water surface level between the two projected images is shown to be approximately the same as between projector screen 620(a) and 620(b), but one is now able to see the breaching fish in its proper perspective in relation to the ocean setting. Robotically controlled projector 624(b) moves the robotic arm horizontally away from robotically controlled projector 620(a) to put distance between them so that when the fish re-enters the ocean water, it appears as if the fish has jumped quite a distance. In timed sequence, the robotic arms of robotically controlled projectors 624(a) and 624(b) move the projectors 626(a) and 626(b) in proper position and angle to display the video imagery on the respective projection screens 620(a) and 620(b). The synchronized movements initiate at another time code (not shown) and are further controlled via subsequent time codes. The position during the synchronized movements of the robotic projectors 624(a) and 624(b) and projector screens 622(a) and 622(b) as shown at the given moment indicated in FIG. 11(b) are defined by the instructions associated with time code 630. At yet another time code 632, FIG. 11(c) shows the breaching fish splash and submerge into the waters depicted on projector screen 622(b), with the other fish shown swimming quickly away from projector screen 620(a) on the same screen. Robotically controlled projector 624(a) moves back down and horizontally towards projector screen 620(b), this time displaying an image of a shark moving towards the school of fish. The position of the synchronized events shown in FIG. 11(c) corresponding to the described image and movements occur at time code 632.

In the above described embodiment, separately controlled robotic mounts can be used to press objects into the back of the projector screens 622(a) and 622(b) to, for instance, emphasize wave motion of the water and, when the breaching first breaches the water and re-submerges, to emphasize the splash and resulting shock wave. These robotic mounts would similarly operate in synchronicity with the robotically controlled projectors 624(a) and 624(b) and robotically controlled projector screens 620(a) and 620(b) in accordance with the time code sequence and the coded instructions programmed for implementation upon and the occurrence of various time codes.

Since the robotically controlled projector screens 620(a) and 620(b) are moving in relation to the robotically controlled projectors 624(a) and 624(b), the aperture of the projector must necessarily be adjusted to maintain focus of the projected image on the projector screens. This, too, can be controlled through programming in association with the time code sequence used to coordinate the movements of the various devices or entertainment elements. Thus, in FIG. 11(b), as the projector screen 620(b) moves further away from the robotic projector 624(b), either the distance between the robotic projector and projector screen can be maintained to eliminate the need to adjust the aperture, else the continuous time code sequences can deliver continuing instructions to the projector indicating the adjustments needed to the aperture (and therefore the focus) to account for an increase or decrease in the relative distance between the projector screen 620(b) and robotic projector 624(b). Knowing the relative motions of the projector screen and robotic screen, distances can be determined and adjustments to the aperture can be made, accordingly. They can also be determined through "dry runs" whereby the entertainment elements are made to perform all of the respective movements while the proper aperture setting is determined in accordance with the changes in relative distance between the devices. This may be performed manually at the various positions, and later entered as program instructions that control these devices and, in this instance, namely the robotic projector's aperture setting. Any other means known in the art for maintaining focus may be used to maintain focus between robotic projectors and robotic screens during synchronous motion where the relative distance varies between the associated devices.

Other robotically-controlled entertainment elements are contemplated by the invention. For example, one or more speakers (electro-static, horn or other type) might be associated with a robotic mount, thereby allowing the position of the one or more speakers to be changed or controlled in the manner described herein. As other examples, one or more light generating or emitting elements (such as one or more lasers, spot lights, light racks or the like), microphones, musical instruments (guitars) or associated equipment (amplifiers), etc., might be associated with a robotic mount. Of course, combinations of such elements might be associated with one or more robotic mounts. For example, an electronic video display and one or more speakers might be associated with the same robotic mount and thus be moved together in three-dimensional space. Any of the above elements can be included in the embodiment shown in FIG. 11 to further enhance the entertainment experience. For instance, speakers and lights could be repositioned in synchronicity with the movements of the robotically controlled projector screen or in some other pre-programmed manner to provide an audio and external lighting experience to coincide with the display. Each of these robotically controlled entertainment elements can be coded to correspond in synchronicity with the other elements through implementation of the same time code sequences. For instance, when the fish splashes into the water in FIG. 11(c), audio elements associated with the aforementioned entertainment elements, including the robotic projectors 624(a) and 624(b) and projector screens 620(a) and 620(b), could be made to receive instructions at the proper time code to play an audio file that provides a splashing sound through robotically controlled speakers that may also move in synchronicity with the other entertainment elements.

Another embodiment of the invention comprises at least one robotically controlled image/video capture device, such as a camera (such as still or moving picture camera; may be film, digital or other types as is well known). Preferably, at least one camera is associated with a robotically controlled mount, such as described in detail above.

As one aspect of the invention, the position of the camera is controlled by the robotic mount. In this manner, the camera captures images, such as moving picture images, from different positions at different times (rather than where a camera is fixed in position and captures images of an object that is moving). Of course, the position of the camera may be changed using the robotic mount, such as to create various effects which are apparent upon playback of the image(s) or video. In one embodiment, a robotic video display may be used to display the images or video, where the position of the video display is changed based upon the position of movement of the camera. For example, the video display may be moved to match the movement of the camera (i.e. the position of the video display during playback is synchronized to the position of the camera during image capture).

The robotically controlled camera can stream or otherwise send images or video content to either of the robotically controlled display or robotically controlled projector for projection to the robotically controlled projector screen. The robotically controlled camera can operate in synchronicity with the robotically controlled display and/or the robotically controlled projector and robotically controlled projector screen. A multitude of coordinated movements can be established between all of the respective robots, in conjunction with video/image projection, video/image display and streamed video or still images from a camera or other image/video capture device to produce a myriad of entertaining displays.

It will be appreciated that the configuration, including size, of a robotic mount may vary, such as depending upon the application. For example, a robotic mount which is configured to move a 60 inch LCD display may be much larger than a robotic mount which is configured to move a spot light.

The invention has other aspects and features. As one aspect of the invention, the robotic mount may be controlled via data which includes one or more time codes.

In one embodiment, as described above, movement of the robotic mount may be based upon or tied to what is displayed on a video display (i.e. synchronized). In one embodiment, a data stream may be generated which includes both robotic mount control instructions and video data which is utilized by the one or more video displays to cause video to be displayed by the one or more displays.

In accordance with the invention, a robotic mount is advantageously configured to move one or more entertainment elements, preferably in three-dimensions. The entertainment elements may thus be "animated", providing a much higher level of entertainment value. For example, the movement of one or more video displays adds entertainment value to the information or images displayed by the one or more video displays. Likewise, the movement of one or more video projectors allows the location of projected images to change, thus adding excitement to the images themselves. Similarly, the movement of a staircase may be used to entertain observers or riders of the staircase.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A robotically controlled entertainment system comprising:
    a robotically controlled projector comprising
        a projector, and
        a first moveable support attached to said projector, said first moveable support being communicatively coupled to at least one first electronic motor configured to move said first moveable support in at least one direction;
    a robotically controlled projector screen comprising
        a projector screen, and
        a second moveable support attached to said projector screen, said second moveable support being communicatively coupled to at least one second electronic motor configured to move said second moveable support in at least one direction;
    at least one memory storage device for storing a plurality of computer coded instructions;
    at least one processor for processing said plurality of computer coded instructions; and
    at least one electronic controller configured to receive said computer coded instructions after processing, send a first signal to said at least one first electronic motor to move said first moveable support, and send a second signal to said at least one second electronic motor to move said second moveable support;
    said computer coded instructions comprising a time code, the time code defining a sequential progression from a start code sequence defining an initiation of processing of said computer coded instructions to an end code sequence defining a termination of processing of said computer coded instructions for each of a distinct unit of time between said initiation and said termination of processing of said computer coded instructions;
    wherein subsequent to said initiation of processing of said computer coded instructions,
        the at least one electronic controller sends said first signal to said at least one first electronic motor according to a first specific instruction from said computer coded instructions, the first specific instruction corresponding to a first time code of said time code, and the first specific instruction causing said at least one first electronic motor to deliver motion in accordance with said first specific instruction at a first time corresponding to said first time code, and
        the at least one electronic controller sends said second signal to said at least one second electronic motor according to a second specific instruction from said computer coded instructions, the second specific instruction corresponding to said first code of said time code, and the seconds specific instruction causing said at least one second electronic motor to deliver motion in accordance with said second specific instruction at said first time corresponding to said first time code, to enable a dynamic video projection display between the at least one robotically controlled projector and the at least one robotically controlled projector screen.

2. The robotically controlled entertainment of claim 1, wherein the first specific instruction is the same as the second specific instruction whereby synchronous movement is generated between the first moveable support and the second moveable support.

3. The robotically controlled entertainment system of claim 1, wherein the computer coded instructions comprise specific movement instructions corresponding to distinct time codes of said time code for each of said distinct unit of time between said initiation and said termination of processing of said computer coded instructions,
wherein said at least one controller sends a signal according to the specific movement instructions to at least one of the at least one first electronic motor and the at least one second electronic motor the signal and the specific movement instructions being distinct for each of said distinct unit of time, and
wherein motion is generated in at least one of the first moveable support and the second moveable support in accordance with the specific movement instructions.

4. The robotically controlled entertainment system of claim 3, further comprising:
an aperture associated with said projector for adjusting the focus of projected graphics; and
an aperture adjustment device capable of receiving signals to control the aperture;
wherein the signal is sent by said controller to the aperture adjustment device to control the aperture of said projector.

5. The robotically controlled entertainment system of claim 3, further comprising:
at least one robotically controlled entertainment element from the list comprising lights, speakers, cameras, musical instruments, and video recorders;
a third moveable support attached to said robotically controlled entertainment element wherein said moveable support is communicatively coupled to at least one third electronic motor configured to move said third moveable support in at least one direction;
wherein the at least one controller is configured to send a third signal to said at least one third electronic motor according to a third specific instruction from said computer coded instructions, the third specific instruction corresponding to said first time code of said time code, and the third specific instruction causing said at least one third electronic motor to deliver motion in accordance with said third specific instruction at said first time corresponding to said first time code to move said third moveable support and said robotically controlled entertainment element simultaneously with the robotically controlled projector and robotically controlled projector screen.

6. The robotically controlled entertainment system of claim 1, wherein at least one of the first moveable support and second moveable support are configured to move in any direction.

7. The robotically controlled entertainment system of claim 1, wherein the projector screen comprises a light-reflective elastic material for receiving a video projection from the projector on one side of said material and impressions from objects of various shapes on the opposite side of said material to establish a three dimensional viewing surface.

8. The robotically controlled entertainment system of claim 1, wherein said computer coded instructions, said at least one electronic controller, said at least one memory storage device, and said at least one processor reside at each of said robotically controlled projector and said robotically controlled projector screen.

* * * * *